US008920740B2

(12) United States Patent
Yang et al.

(10) Patent No.: US 8,920,740 B2
(45) Date of Patent: Dec. 30, 2014

(54) ATMOSPHERIC PRESSURE PLASMA JET DEVICE

(75) Inventors: Arnold Chang-Mou Yang, Hsinchu (TW); Chun-Chih Chang, Taichung (TW); Chung-Sung Tan, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 55 days.

(21) Appl. No.: 13/417,803

(22) Filed: Mar. 12, 2012

(65) Prior Publication Data

US 2013/0052092 A1 Feb. 28, 2013

(30) Foreign Application Priority Data

Aug. 24, 2011 (TW) ............................ 100130399 A

(51) Int. Cl.

*B01J 19/08* (2006.01)
*H05H 1/30* (2006.01)
*H05H 1/42* (2006.01)

(52) U.S. Cl.

CPC . *H05H 1/30* (2013.01); *H05H 1/42* (2013.01); *H05H 2240/10* (2013.01)
USPC ....................... 422/186.04; 422/186; 422/162

(58) Field of Classification Search

CPC ........ H05H 1/30; H05H 1/42; H05H 2240/10
USPC .................................... 422/186.04, 186, 162
See application file for complete search history.

(56) References Cited

U.S. PATENT DOCUMENTS 3,585,434 A 6/1971 Kato et al.
5,693,241 A * 12/1997 Banks et al. ............ 219/121.11
5,961,772 A 10/1999 Selwyn
6,121,572 A * 9/2000 Holste et al. ............ 219/121.59
6,659,110 B2 * 12/2003 Fornsel et al. ................ 134/1.1
6,800,336 B1 * 10/2004 Fornsel et al. ............... 427/562
2006/0048893 A1 3/2006 Selwyn et al.
2006/0272505 A1 * 12/2006 Tanaka et al. ..................... 96/96
2008/0257379 A1 * 10/2008 Buske et al. .................. 134/1.1
2009/0194408 A1 8/2009 Yang

OTHER PUBLICATIONS

Li Xiang et al.; "Carbon Dioxide Reforming of Methane to Synthesis Gas by an Atmospheric Pressure Plasma Jet"; Journal of Fuel Chemistry and Technology, vol. 38 No. 2, Apr. 2010.

Office Action of corresponding CN application, issued on Jul. 31, 2014.

* cited by examiner

*Primary Examiner* — Xiuyu Tai

(74) *Attorney, Agent, or Firm* — Wang Law Firm, Inc.; Li K. Wang; Stephen Hsu

(57) ABSTRACT

An atmospheric pressure plasma jet device for converting carbon dioxide into organic products by using an atmospheric pressure plasma technique, comprising: an inner electrode made of a conductive metal, and having an insulating layer covering a portion of the inner electrode; a first conductive metal wall surrounding the inner electrode with a predetermined distance apart, such that a cavity is formed between the inner electrode and the first conductive metal wall, and a through hole is formed on a side of the first conductive metal wall, such that a reactant can flow into the cavity; and a diffusing unit including an insulating component and a conductive metal component. Wherein the insulating component is disposed on a side of the insulating layer, and covers another portion of the inner electrode. The conductive metal component further covers the insulating component.

13 Claims, 6 Drawing Sheets

ATMOSPHERIC PRESSURE PLASMA JET DEVICE

CROSS-REFERENCE TO RELATED APPLICATION

This application claims the benefit of Taiwan Patent Application No. 100130399, filed on Aug. 24, 2011, in the Taiwan Intellectual Property Office, the disclosure of which is incorporated herein in its entirety by reference.

FIELD OF THE INVENTION

The present invention relates to an atmospheric pressure plasma jet device, in particular to the atmospheric pressure plasma jet device for converting carbon dioxide into organic products by an atmospheric pressure plasma technique.

BACKGROUND OF THE INVENTION

At present, the plasma technique is used extensively in many industries including petrochemical, optoelectronic and semiconductor industry, 3C and automobile parts industry, livelihood and food industry, and biomedical material industry, etc, and most of the well-developed plasma techniques are applied in a vacuum process with many drawbacks, such as a long vacuum time, a high cost for the vacuum equipments and related maintenance fees, an object size limited by the size of the cavity, and unable to perform continuous processes on a production line. Although the most economical and efficient method of producing plasma is working under atmospheric pressure, for maintaining the stability of the plasma, the system is generally operated at a low pressure in the manufacturing process. Therefore it is necessary to vacuum the cavity and have a vacuum pump to maintain the low-pressure environment, and thus incurring a high cost, a high maintenance fee, and a significant decrease of processing quantity per unit time. For example, the vacuum pump is easily damaged by strong acids, strong alkalis, and microparticles. As a result, it is a major subject for related manufacturers to produce plasma stably under atmospheric pressure by simple equipments, operations and maintenance fees without requiring the use of the aforementioned equipments, such that the device can be operated easily and continuously to increase the processing quantity without being limited by the size of the vacuum cavity.

Since the atmospheric pressure plasma technique does not have the foregoing limitations, this technique involves lower equipment and operation costs and provides a fast operation, and thus, it is applicable for the operations in a continuous manufacturing procedure, and this technique can be used with any combination of other continuous equipments to enhance the production efficiency. Compared with the traditional low-pressure plasma, the atmospheric pressure plasma expands the application of the plasma significantly, particularly the atmospheric plasma jet system has a feature of producing non-thermal plasma and it can be integrated with a manufacturing process in a production line easily and catches much attention of the related manufacturers. Since the plasma jet system has the feature of power saving, easy operation and maintenance, and small volume of the equipment, it has tremendous potential to be applied in the industry.

In related arts and applications, U.S. Pat. Application No. US20060048893 discloses a non-arcing atmospheric pressure processing reactors comprising (a) a wafer platform that is electrically conductive; (b) at least one radio frequency electrode operatively placed near said wafer platform to allow creation of an electric field between said wafer platform and said at least one radio frequency electrode; (c) an RF power supply electrically attached to said at least one radio frequency electrode and said wafer platform to create said electric field for generation of said non-arcing atmospheric pressure plasma; (d) a process gas supplier comprising a mixture of 90% to 99% support gas to 1% to 10% reactive gas to create said non-arcing atmospheric pressure plasma in the presence of said electric field. U.S. Pat. No. 3,585,434 discloses a plasma jet generating apparatus, comprising a cathode formed of an annular electrode and an anode formed of a cylindrical electrode inserted at the central portion of said annular cathode wherein an arc is generated between the electrodes to heat a gas to a high temperature. In addition, U.S. Pat. No. 5,961,772 discloses an atmospheric-pressure plasma jet comprising: (a) an electrically conducting, grounded cylindrical chamber which is not tapered having a closed end, an open end, and a longitudinal axis; (b) a cylindrical electrode located within said cylindrical chamber having a longitudinal axis and disposed such that the longitudinal axis thereof is collinear with the longitudinal axis of said cylindrical chamber, defining thereby an annular region; (c) a cylindrical insulating cap located at the end of said cylindrical electrode at the end thereof closest to the open end of said cylindrical chamber, and inside said cylindrical chamber, for preventing arcing between said cylindrical electrode and said cylindrical chamber.

However, there is still no atmospheric plasma jet system provided for converting carbon dioxide into organic products.

It is noteworthy to point out that the foregoing cited references are provided for describing the background of the present invention, and the contents of these references are well known arts.

SUMMARY OF THE INVENTION

Therefore, it is a primary objective of the present invention to provide an atmospheric pressure plasma technique capable of activating carbon dioxide and water by plasma, and then converting into organic products, and the conversion process doesn't require any catalysts or any high pressure compressed carbon dioxide gas, so that the invention has the advantages of being operated at atmospheric pressure and having a quick reaction.

Another objective of the present invention is to convert carbon dioxide into useful organic products which can be used as petrochemical plastic polymer materials as well as small organic molecules of fuels. This method can be used to simplify the traditional chemical process and reduce the time and cost for converting carbon dioxide into organic products, and thus is very useful for mass production and in compliance with economic benefits.

To achieve the aforementioned objectives, the present invention provides a device that uses an atmospheric pressure plasma technique to convert carbon dioxide into organic matters and fuels, and the conversion can take place at atmospheric pressure without requiring any catalyst, and a vibrational excitation method is used for providing energy to decompose and convert carbon dioxide into organic products by an antisymmetric stretching mechanism, while the carbon dioxide is in a plasma state.

To achieve the aforementioned objectives, the present invention provides an atmospheric pressure plasma jet device for converting carbon dioxide into an organic product by using an atmospheric pressure plasma technique, comprising: an inner electrode, made of a conductive metal, and having an insulating layer for covering a portion of the inner electrode;

a first conductive metal wall, surrounding the inner electrode with a predetermined distance apart, such that a cavity is formed between the inner electrode and the first conductive metal wall, and a through hole is formed on a side of the first conductive metal wall for allowing a reactant to flow into the cavity; and a diffusing unit, including an insulating component and a conductive metal component, and the insulating component is disposed on a side of the insulating layer, and covered onto another portion of the inner electrode and disposed opposite to the through hole, and the conductive metal component further covering the insulating component.

Preferably, the atmospheric pressure plasma jet device of the present invention further comprises a plasma supplying device coupled to the inner electrode.

Preferably, the inner electrode contains a metal, tungsten.

Preferably, the atmospheric pressure plasma jet device of the present invention further comprises a ground electrode installed at a position of the first conductive metal wall.

Preferably, the atmospheric pressure plasma jet device of the present invention further comprises an external casing for covering the insulating layer, and fixing and adjusting a horizontal displacement of the inner electrode.

Preferably, the reactant is carbon dioxide, water or an alkyl compound, and the alkyl compound contains methane, and the ratio of carbon dioxide to water in volume percentage falls within a range of 100:1~1:100, and the temperature of water falls within a range of 20~100° C., and the flow of carbon dioxide falls within a range of 0.1~100 slm.

Preferably, the atmospheric pressure plasma jet device of the present invention further comprises a second conductive metal wall coupled to the first conductive metal wall and movably installed at an end opposite to the insulating layer and having an opening extending axially towards the inner electrode, such that the organic products are discharged concentratively. By adjusting an angle, the second conductive metal wall can maintain the stability of discharging the organic products.

Preferably, the organic products produced after the reaction of the atmospheric pressure plasma jet device of the present invention are esters, ethers, acids, alcohols, aldehydes, ketones, straight-chain hydrocarbons, cyclic hydrocarbons or any combination of the above.

Preferably, the diffusing unit is used for reducing the impact of the reactant on the inner electrode, so that the organic products can be discharged stably by a laminar flow after the reactant flows into the cavity.

Preferably, the atmospheric pressure plasma jet device of the present invention further comprises a power supply device coupled to the inner electrode and having a frequency falling within a range of 60~9000 Hz.

Preferably, the inner electrode is a radio frequency electrode having a frequency falling within a range of 6.78~27 MHz.

An atmospheric pressure plasma device is further provided in the present invention, which comprises a plasma generator, a reactant supplier, and a reacting cavity. The plasma generator is arranged for converting the electric energy to plasma under atmospheric pressure. The reactant supplier is arranged for supplying a reactant. And the reacting cavity is coupled with the plasma generator and the reactant supplier. The reacting cavity is arranged for accommodating the plasma and the reactant and allowing the reactant react with the plasma to produce at least one organic product. Preferably, the reactant comprises a mixture of carbon dioxide and water.

Preferably, the plasma generator comprises an inner electrode and a conductive metal wall surrounding the inner electrode, and the reacting cavity is defined between the inner electrode and the conductive metal wall.

Preferably, the conductive metal wall extents to a distal end beyond the inner electrode and then toward a center of conductive metal wall, and an opening is formed at the distal end with a diameter smaller than that of the conductive metal wall.

Preferably, the reactant supplier is a through hole formed on the conductive metal wall.

The other characteristics and advantages of the present invention will be described below and become apparent with the detailed description or the implementation of the present invention.

BRIEF DESCRIPTION OF THE DRAWINGS

The aforementioned and other characteristics and advantages will become apparent with the detailed description of preferred embodiments together with the illustration of related drawings as follows.

DESCRIPTION OF THE PREFERRED EMBODIMENTS

Reference will now be made in detail to implementations of the exemplary embodiment(s) as illustrated in the accompanying drawings. The same reference indicators will be used throughout the drawings and the following detailed description to refer to the same or like parts.

The technical characteristics of the present invention become apparent with the detailed description of preferred embodiments and the illustration of related drawings as follows. It is noteworthy to point out that the preferred embodiments are provided for the purpose of illustrating the invention only, but not intended for limiting the scope of the invention, and the same numerals are used in the following preferred embodiments to represent respective elements.

Figure 1:
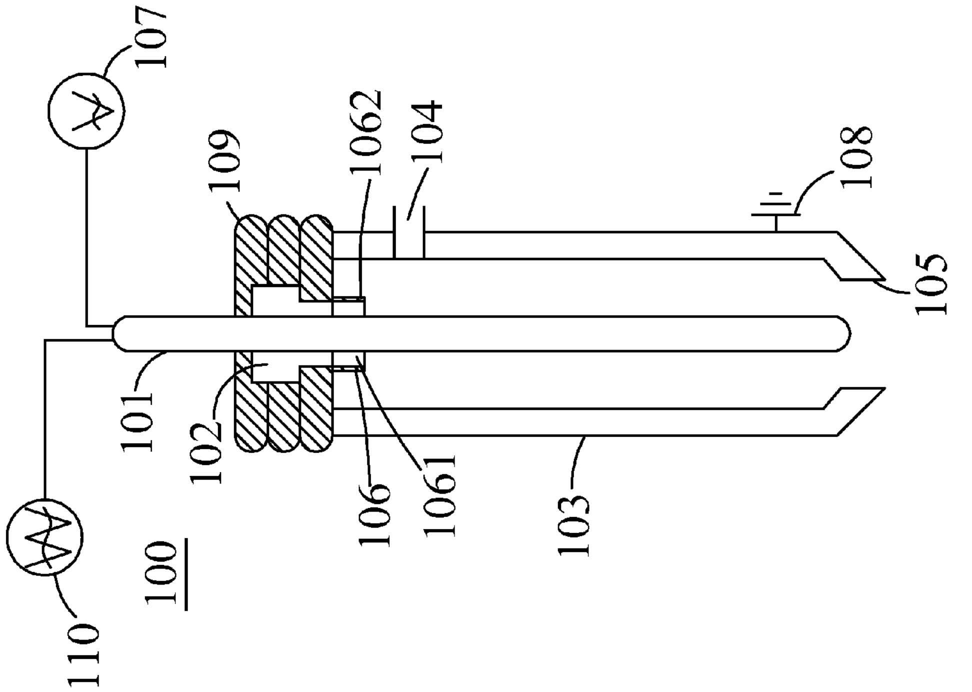
FIG. 1 is a cross-sectional view of an atmospheric pressure plasma jet device of the present invention.

With reference to FIG. 1 for a cross-sectional view of an atmospheric pressure plasma jet device of the present invention, the atmospheric pressure plasma jet device 100 comprises: an inner electrode 101 made of a high-temperature resisting, high-rigidity and high-conductivity metal such as tungsten, which can provide a better wearing resisting effect for the inner electrode 101. The inner electrode 101 is installed at the central position of the atmospheric pressure plasma jet device 100 and includes an insulating layer 102 that covers a portion of the inner electrode 101; a first conductive metal wall 103, surrounding inner electrode 101 with a predetermined distance apart, so that a cavity is formed between the inner electrode 101 and the first conductive metal wall 103, wherein a through hole 104 is formed on a side of the first conductive metal wall 103, such that the reactant can flow into the cavity; a second conductive metal wall 105 movably installed at an end of the first conductive metal wall 103 opposite to the insulating layer 102, and an opening is formed and extended axially towards the inner electrode 101, not only capable of discharging organic products concentratively, but also capable of maintaining a stability of discharging the products by changing the material or adjusting the angle.

In short, the inner electro 101 and the first conductive metal wall 103 surrounding the inner electro 101 act cooperatively as a plasma generator which converts electric energy to plasma under atmospheric pressure. And the cavity formed between in the inner electrode 101 and the first conductive metal wall 103 serves as a reacting cavity for accommodating the plasma and the reactant and allow the reactant react with the plasma to produce at least one organic product. The reactant may comprise a mixture of carbon dioxide and water. Preferably, as shown in the figure, the first conductive metal wall 103 extents to a distal end beyond the inner electrode 101 and then further extents toward the center of the first conductive metal wall 103, such that an opening is formed at the distal end with a diameter smaller than that of the first conductive metal wall 103. In addition, the through hole 104 formed on the first conductive metal wall 103 may act as a reactant supplier which provides reactant into the reacting cavity.

In addition, the atmospheric pressure plasma jet device 100 of the present invention further comprises a diffusing unit 106 including an insulating component 1061 and a conductive metal component 1062. Wherein, the insulating component 1061 is installed on a side of the insulating layer 102, covered onto another portion of the inner electrode 101, and disposed opposite to the through hole 104, and the conductive metal component 1062 is further covered by the insulating component 1061. Wherein, the diffusing unit 106 can used for preventing a direct impact of the reactant on the inner electrode 101 after the reactant flows into the cavity and allow the products to be discharged stably by a laminar flow method, so as to further improve the electric discharge stability of the inner electrode 101. The plasma supplying device 107 is coupled to the inner electrode 101. A ground electrode 108 is installed on a side of the first conductive metal wall 103. An external casing 109 is covered onto the insulating layer 102 for fixing and adjusting a horizontal displacement of the inner electrode 101, so that the inner electrode 101 is disposed at the central position of the atmospheric pressure plasma jet device 100. A power supply device 110 is coupled to the inner electrode 101 and has a frequency falling within a range of 60~9000 Hz, wherein 60 Hz is the frequency of a general AC (alternating current) power. If the electric power or the quantity of the reactant is relatively large, the frequency can reach up to 9000 Hz. At low frequencies, the plasma supplying device 107 can produce plasma more easily with a lower cost, but it is more difficult to dissociate the reactant. At high frequencies, it is not easy for the plasma supplying device 107 to produce plasma, and the process incurs a higher cost, but the reactant can be dissociated easily.

Preferably, the reactant is selected from the group consisting of carbon dioxide, water and an alkyl compound, and the alkyl compound includes methane and the ratio of carbon dioxide to water in volume percentage falls within a range of 100:1~1:100, preferably 3:1~9:1, and more preferably 7.2:1. The temperature of the water falls within a range of 20~100° C., preferably 80° C., and the flow of carbon dioxide falls within a range of 0.1~100 slm, preferably 3 slm.

Preferably, the inner electrode 101 is a radio frequency electrode with a frequency falling within a range of 6.78~27 MHz, preferably 13.56 MHz.

The mechanism for dissociating carbon dioxide and water flowing into an atmospheric pressure plasma jet device of the present invention is given below:

$$CO_2 \rightarrow CO+O$$

$$H_2O \rightarrow OH+H \rightarrow O+H+H$$

The mechanism for obtaining the organic products by activation is given below:

$$CO_2+2H_2 \rightarrow CH_3OH+\frac{1}{2}O_2$$

Figure 2A:
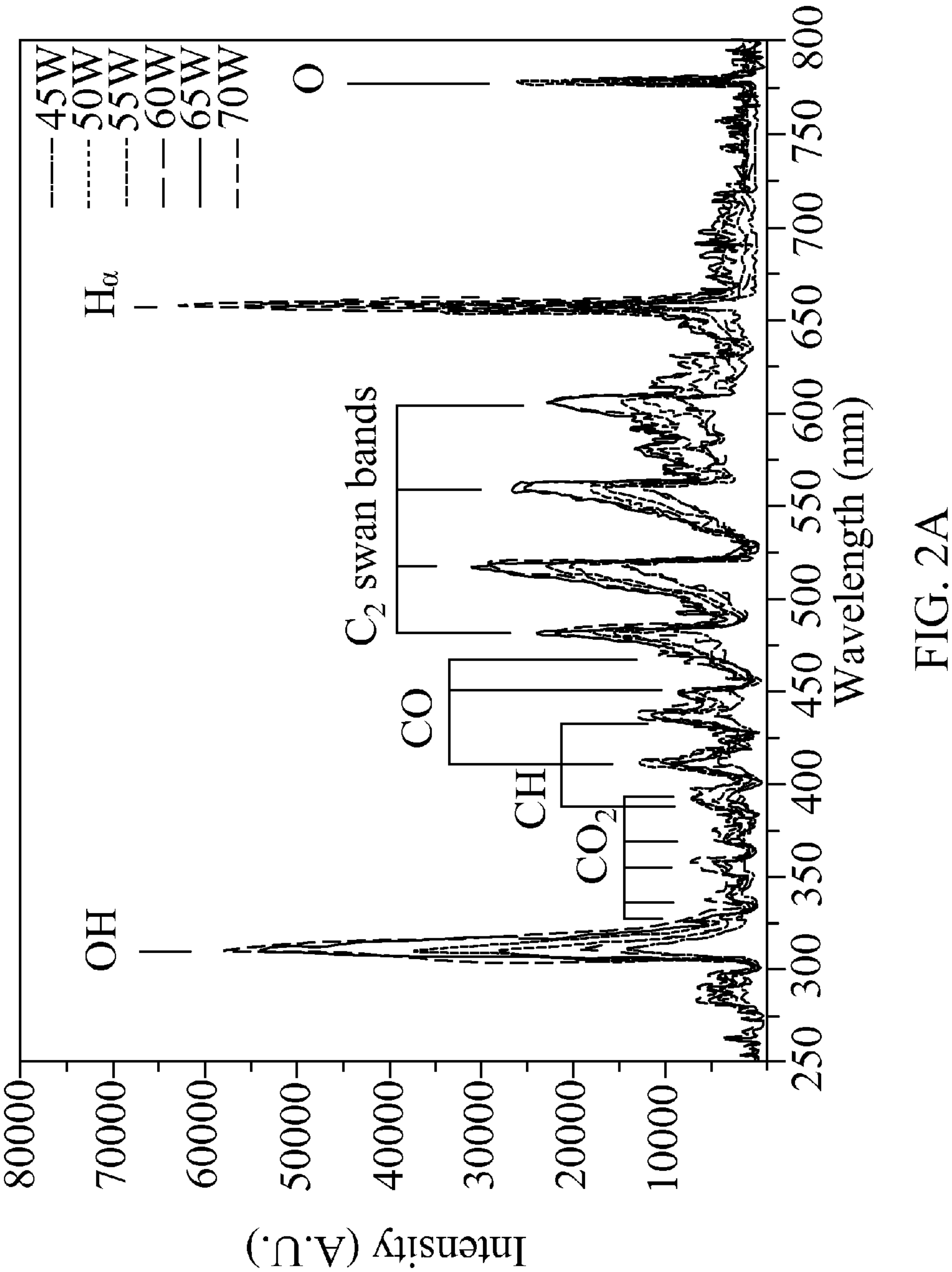
FIG. 2A is a chart of intensity versus wavelength obtained from an optical emission spectroscopy (OES) analysis after a reactant is activated by an atmospheric pressure plasma jet device of the present invention.
Figure 2B:
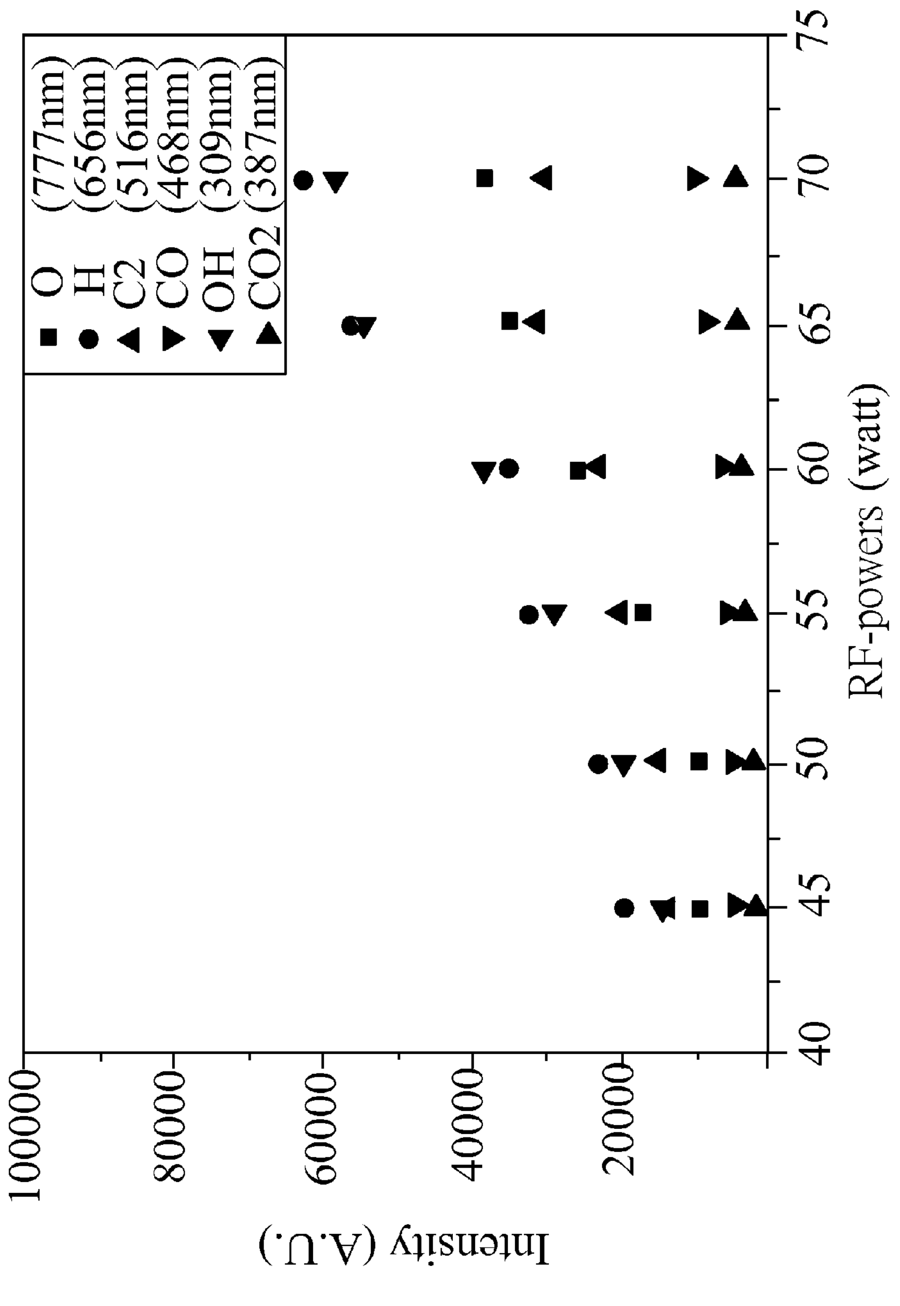
FIG. 2B is a chart of the electric discharge power of an inner electrode versus the strength of molecular debris after the activation by the atmospheric pressure plasma jet device of the present invention takes place.

Therefore, plasma can be used to activate the carbon dioxide and water, and then the double-bond of carbon dioxide and water is broken to produce reactive fragments of molecules. After the parameters of the plasma are adjusted, fragments of molecules with different breaking levels can be obtained. An optical emission spectroscopy (OES) analysis is performed to obtain the analysis result of the molecule fragments (as shown in Table 1 and FIG. 2A). With reference to FIG. 2B, 45-70 W is applied to the inner electrode 101, and the strength of the molecule fragments is obtained, and different molecule fragments are rebuilt to obtain products of alcohols as well as esters, ethers, acids, alcohols, aldehydes, ketones, straight-chain hydrocarbons, cyclic hydrocarbons or any combination of the above.

TABLE 1

| Molecule fragments of a reactant after the double bond breaks | | |
|---|---|---|
| Species | λ(nm) | Transition |
| OH | 308 | $A^2\Sigma_+ \rightarrow X^2\Pi$ |
| $CO_2$ | 328 | $A^2\Pi_U \rightarrow X^2\Pi_8$ |
| | 340 | $A^2\Pi_U \rightarrow X^2\Pi_8$ |
| | 354 | $A^2\Pi_U \rightarrow X^2\Pi_8$ |
| | 368 | $A^2\Pi_U \rightarrow X^2\Pi_8$ |
| | 393 | $A^2\Pi_U \rightarrow X^2\Pi_8$ |
| CH | 431 | $A^2\Delta \rightarrow X^2\Pi$ |
| CO | 413 | $B^1\Sigma^+ \rightarrow A^1\Pi$ |
| | 451 | $B^1\Sigma^+ \rightarrow A^1\Pi$ |
| | 470 | $B^1\Sigma^+ \rightarrow A^1\Pi$ |
| | 518 | $B^1\Sigma^+ \rightarrow A^1\Pi$ |
| | 662 | $B^1\Sigma^+ \rightarrow A^1\Pi$ |
| $C_2$ | 481 | Swan bands |
| | 516 | Swan bands |
| | 557 | Swan bands |
| | 606 | Swan bands |
| H | 656 | alpha |
| O | 777.0 | $3_p{}^5P \rightarrow 3s^5S$ |

Figure 3:
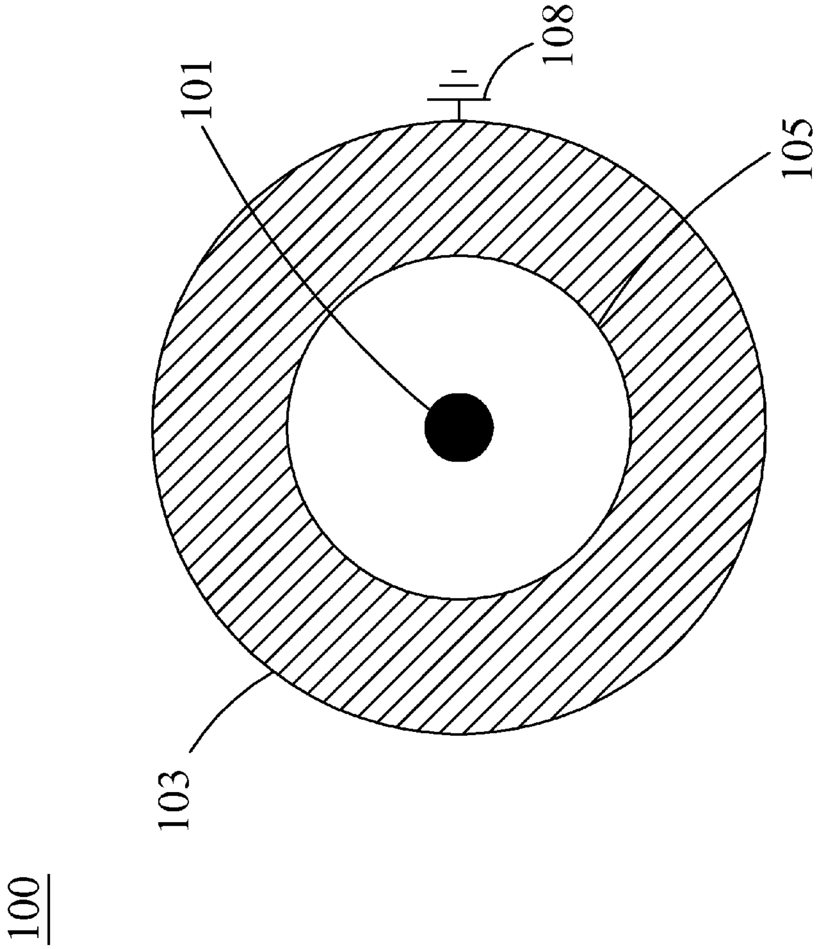
FIG. 3 is a bottom view of an atmospheric pressure plasma jet device of the present invention.

With reference to FIG. 3 for a bottom view of an atmospheric pressure plasma jet device of the present invention, the atmospheric pressure plasma jet device is a circular pen structure, but the invention is not limited this shape only, but it can be a plate shaped structure, too.

Figure 4:
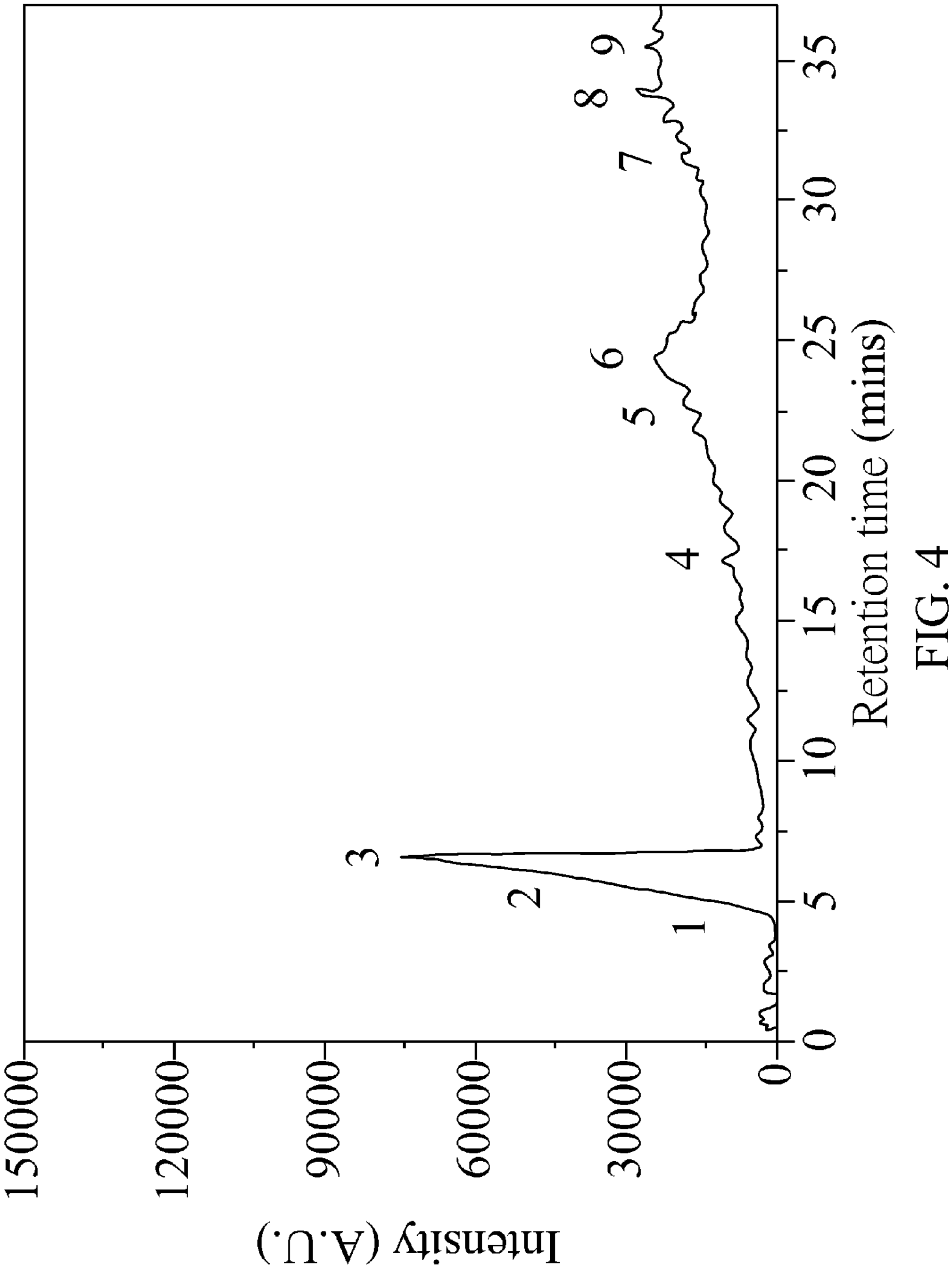
FIG. 4 shows an analysis result of an atmospheric pressure plasma jet device of the present invention obtained from an analysis performed by using 50 W for a reaction and analyzed by a gas chromatography-mass spectrometry.

With reference to Tables 2 and FIG. 4, Table 2 shows that the ratio of carbon dioxide to water in volume percentage is equal to 7.2:1, the flow of carbon dioxide is equal to 3 slm, the water temperature is equal to 80° C., the power supplied to the plasma supplying device is equal to 50 W, and carbon dioxide and water are introduced into the atmospheric pressure plasma jet device of the present invention and excited by plasma, and the product is analyzed by a gas chromatography-mass spectrometry (GC/MS), and the results are shown in FIG. 4. The wave peaks are analyzed, the retention time show that the products are benzene, alkyl-benzene, ether-benzene and ketone-benzene, alkane, ether, ketone and aldehyde, alcohol, phenol, and diol, and the results are listed in Table 2.

TABLE 2

Products produced by an atmospheric pressure plasma jet device at the condition of 50 W.

| Wave Peak | Product | Retention Time (mins) | Characteristic Ion (m/z) |
|---|---|---|---|
| 1 | Benzene | 4.624 | 77, 78 |
| 2 | Alkyl-Benzene | 5.709 | 43, 77, 91, 105, 162 |
| 3 | Ether-Benzene and Ketone-Benzene | 6.587 | 43, 45, 65, 77, 91, 105, 108, 115, 154, 162 |
| 4 | Alkane | 17.345 | 43, 57, 71, 85 |
| 5 | Ether | 20.124 | 43, 57, 69, 71, 85, 97 |
| 6 | Ketone and Aldehyde | 24.413 | 41, 43, 55, 57, 69, 71, 85, 91, 119 |
| 7 | Alcohol | 32.266 | 41, 43, 45, 59, 71, 73, 89, 91, 105, 106, 119 |
| 8 | Phenol | 33.816 | 39, 41, 42, 43, 45, 55, 57, 65, 71, 73, 77, 78, 87, 89, 91, 94, 105, 106, 119, 121 |
| 9 | Diol | 36.296 | 39, 41, 42, 43, 45, 55, 57, 59, 71, 73, 87, 89, 91, 105, 119 |

Figure 5:
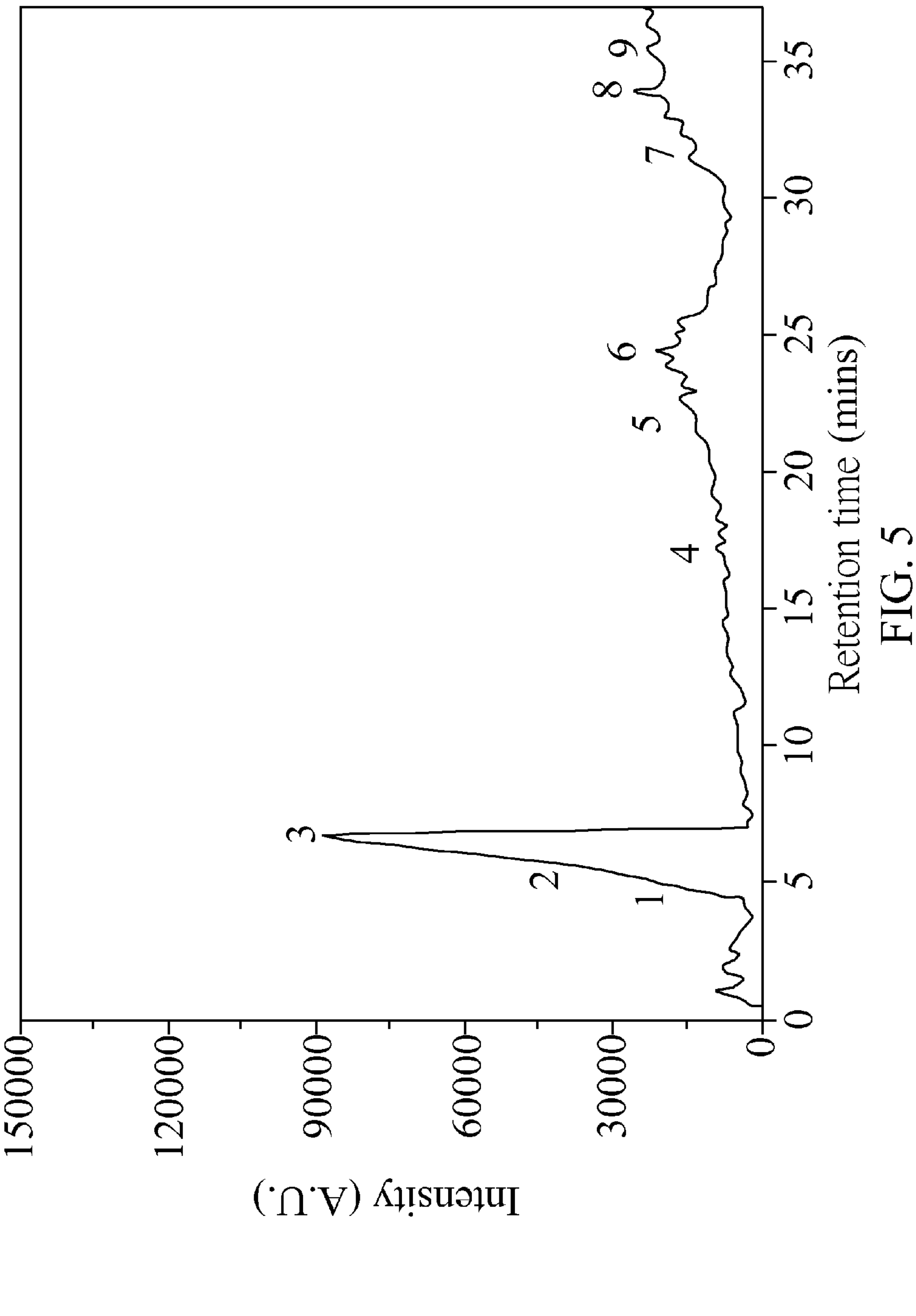
FIG. 5 shows an analysis result of an atmospheric pressure plasma jet device of the present invention obtained from an analysis performed by using 60 W for a reaction and analyzed by a gas chromatography-mass spectrometry.

With reference to Table 3 and FIG. 5, Table 3 shows that the ratio of carbon dioxide to water in volume percentage is equal to 7.2:1, the flow of carbon dioxide is equal to 3 slm, the water temperature is equal to 80° C., the power supplied to the plasma supplying device is equal to 60 W, and carbon dioxide and water are introduced into the atmospheric pressure plasma jet device of the present invention and excited by plasma, and the product is analyzed by a gas chromatography-mass spectrometry (GC/MS), and the results are shown in FIG. 5. The wave peaks are analyzed, the retention time show that the products are benzene, alkyl-benzene, ether-benzene and ketone-benzene, alkane, ether, ketone and aldehyde, alcohol, phenol, and diol, and the results are listed in Table 3.

TABLE 3

Products produced by an atmospheric pressure plasma jet device at the condition of 60 W.

| Wave Peak | Product | Retention Time (mins) | Characteristic Ion (m/z) |
|---|---|---|---|
| 1 | Benzene | 4.624 | 77, 78 |
| 2 | Alkyl-Benzene | 5.709 | 39, 43, 77, 91 |
| 3 | Ether-Benzene and Ketone-Benzene | 6.587 | 39, 41, 43, 45, 65, 77, 78, 79, 91, 93, 95, 105 |
| 4 | Alkane | 17.345 | 43, 57, 71, 85 |
| 5 | Ether | 20.124 | 43, 57, 91, 105, 119 |
| 6 | Ketone and Aldehyde | 24.413 | 41, 43, 55, 57, 71, 85, 91, 119 |
| 7 | Alcohol | 32.266 | 39, 41, 43, 45, 59, 71, 73, 89, 91, 105, 106 |
| 8 | Phenol | 33.816 | 39, 41, 42, 43, 45, 73, 77, 89, 91, 106, 119 |
| 9 | Diol | 36.296 | 39, 41, 43, 43, 45, 59, 73, 87, 89, 91 |

The invention improves over the prior art and complies with patent application requirements, and thus is duly filed for patent application. While the invention has been described by device of specific embodiments, numerous modifications and variations could be made thereto by those generally skilled in the art without departing from the scope and spirit of the invention set forth in the claims.

What is claimed is:

1. An atmospheric pressure plasma jet device, comprising:

an inner electrode, made of a conductive metal, and having an insulating layer, the insulating layer covering a portion of the inner electrode;

a first conductive metal wall, surrounding the inner electrode with a predetermined distance apart, such that a cavity being formed between the inner electrode and the first conductive metal wall;

a through hole being formed on a side of the first conductive metal wall, and a reactant flowing into the cavity via the through hole, and the reactant reacting with the atmospheric pressure plasma generated in the cavity, and the reactant being converted into at least one organic product in the cavity; and a diffusing unit disposed opposite to the through hole, the diffusing unit surrounding the inner electrode including an insulating component and a conductive metal component, the insulating component being disposed on a side of the insulating layer, and the insulating component covering another portion of the inner electrode, and the conductive metal component further covering the insulating component without contacting with the insulating layer and the first conductive metal wall such that the first conductive metal wall surrounds the conductive metal component with an interval apart;

wherein, when the reactant flows into the cavity via the through hole, the diffusing unit prevents a direct impact from the reactant toward the inner electrode, and the organic products is discharged stably by a laminar flow method after the reactant flows into the cavity.

2. The atmospheric pressure plasma jet device of claim 1, further comprising a plasma supplying device coupled to the inner electrode.

3. The atmospheric pressure plasma jet device of claim 1, wherein the inner electrode contains tungsten.

4. The atmospheric pressure plasma jet device of claim 1, further comprising a ground electrode installed at a position of the first conductive metal wall.

5. The atmospheric pressure plasma jet device of claim 1, further comprising an external casing for covering the insulating layer, and fixing and adjusting a horizontal displacement of the inner electrode.

6. The atmospheric pressure plasma jet device of claim 1, wherein the reactant is one selected from the collection of carbon dioxide, water and alkyl compound.

7. The atmospheric pressure plasma jet device of claim 6, wherein the alkyl compound contains methane.

8. The atmospheric pressure plasma jet device of claim 6, wherein the carbon dioxide and the water have a ratio in volume percentage falling within a range of 100:1~1:100.

9. The atmospheric pressure plasma jet device of claim 6, wherein the water has a temperature falling within a range of 20~100° C.

10. The atmospheric pressure plasma jet device of claim 6, wherein the carbon dioxide has a flow falling within a range of 0.1~100 slm.

11. The atmospheric pressure plasma jet device of claim 1, further comprising a second conductive metal wall installed at an end of the first conductive metal wall opposite to the insulating layer and having an opening extending axially towards the inner electrode, such that the organic products are discharged concentratively.

12. The atmospheric pressure plasma jet device of claim 1, wherein the organic products produced after the reaction of the atmospheric pressure plasma jet device are esters, ethers, acids, alcohols, aldehydes, ketones, straight-chain hydrocarbons, cyclic hydrocarbons or any combination of the above.

13. The atmospheric pressure plasma jet device of claim 1, further comprising a power supply device coupled to the inner electrode and having a frequency falling within a range of 60~9000 Hz.

* * * * *